Figures 1, 2:
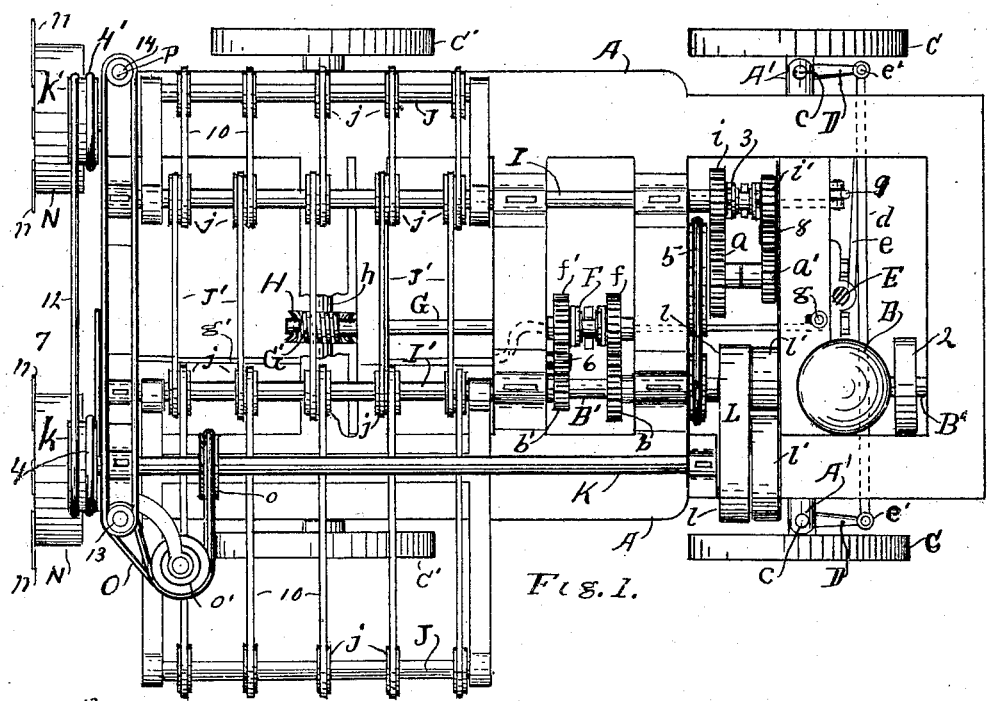

No. 858,061. PATENTED JUNE 25, 1907.
J. D. COOPER.
CANE HARVESTER, (TRIMMER).
APPLICATION FILED NOV. 4, 1905.

2 SHEETS—SHEET 1.

Witnesses
A. Allgier
V. J. Cilley

Inventor
John D. Cooper
By Jetriel J. Cilley
Attorney

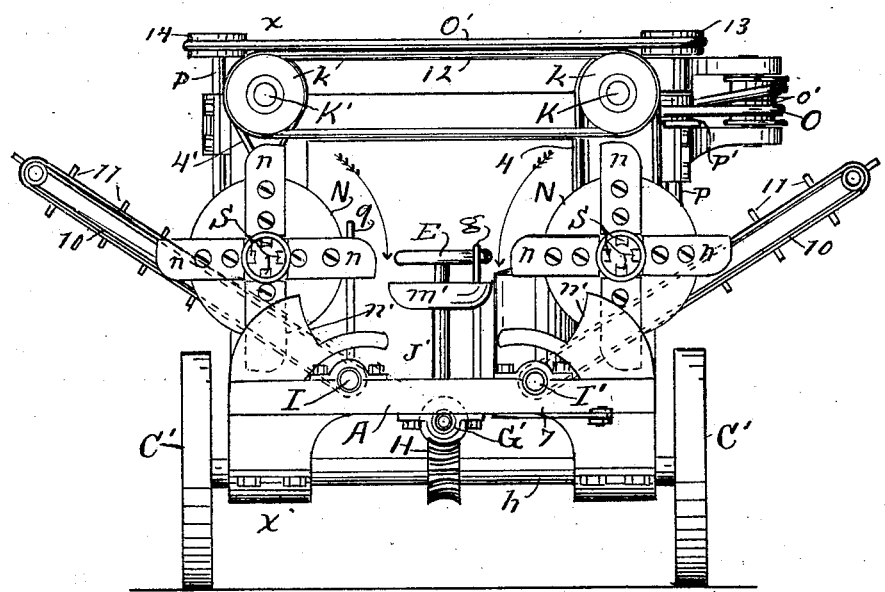
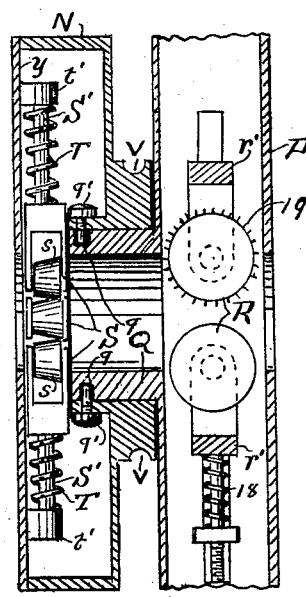
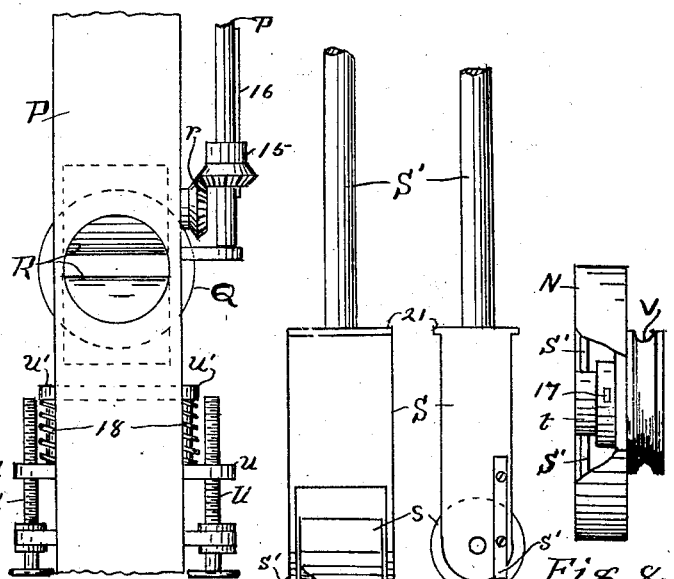
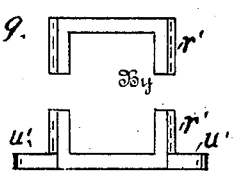

UNITED STATES PATENT OFFICE.

JOHN D. COOPER, OF GRAND RAPIDS, MICHIGAN.

CANE-HARVESTER. (TRIMMER).

No. 858,061.          Specification of Letters Patent.          Patented June 25, 1907.

Application filed November 4, 1905. Serial No. 285,906.

*To all whom it may concern:*

Be it known that I, JOHN D. COOPER, a citizen of the United States, residing at Grand Rapids, in the county of Kent and State of Michigan, have invented certain new and useful Improvements in Cane-Harvesters, (Trimmers,) of which the following is a specification.

My invention relates to improvements in cane harvesters, and its objects are: first, to provide a machine with which the tassels and leaves may be readily cut and stripped from the stocks; second, to provide such a machine with which the cane stocks, after having been stripped of the leaves, will be conveyed to, and loaded into the collecting cart; third, to provide such a machine with which the conveying mechanism may be made to discharge the cane either side of the machine; fourth, to provide such a machine with which the feed mechanism will be self adjustable to the various sizes of the cane being operated upon, and, fifth, to provide such a machine that may be started, stopped and adjusted at pleasure by the operators at the back end of the machine. I attain these objects by the mechanism illustrated in the accompanying drawings in which Figure 1 is a top plan of the machine with one of the conveyer wings extended in position to convey the cane to a cart standing beside the machine, and the other wing partly elevated to position not to interfere with adjacent rows of cane when the machine is moving through a field of cane; Fig. 2 is a side elevation of the same; Fig. 3 is a back end elevation of the same; Fig. 4 is a vertical section of the hind post and the stripping cylinder on the line X X of Fig. 3; Fig. 5 is a front elevation of one hind post showing the application of the feed rollers, but with the stripping cylinder removed; Figs. 6 and 7 are a side view and an edge view of the stripping head showing antifriction rollers; Fig. 8 is a side elevation of the stripping cylinder cut away to show the manner of placing the stripper heads into it, and Fig. 9 is a side elevation of the boxes that carry the feed rollers, standing in the relative positions they occupy in the machine. with the rollers removed.

Similar letters refer to similar parts throughout the several views.

A represents the frame or bed of the machine; B, the motor that propels it; B' is the main engine or motor shaft; 2 is the balance wheel; C and C' are the front and back wheels, respectively; A' is the front axletree, and 22 is the motor crank.

The motor shaft B' has a gear wheel $b$ firmly mounted thereon and arranged to mesh with the gear wheel $f$, on the propelling shaft G. This gear wheel, and also the gear wheel $f''$, are loosely mounted on the shaft G, so that either one or both may revolve freely on the shaft. There is, also mounted on the shaft B', a smaller gear wheel $b'$ which, through the idler 6, engages the gear wheel $f''$ to reverse the motion of the shaft G, when desired. To utilize these gear wheels a clutch F is mounted on the shaft G between the gear wheels $f$ and $f''$ and arranged to be made to engage either of these gear wheels, as desired, by means of the shifting lever $g$, from the front of the machine, or the lever 7, through the connecting rod $g'$, from the back of the machine, in the usual manner of adjusting and reversing this general class of transmission and reversing gear. At the back end of the shaft G is mounted a screw gear G', in position to engage a second screw gear H, the latter being securely mounted upon the axletree $h$, upon which the hind wheels C' are securely mounted so that the revolving of the shaft G will cause the machine to move forward or backward, as the transmission gear, hereinbefore described, is adjusted.

The mechanism for cutting off the tassels and stripping off the leaves from the cane consists of two stripping cylinders N mounted on the hollow bearings Q, which, in turn, are integral with the posts P. These cylinders are hollow, as indicated in Figs. 3 and 4, and are connected to revolve on the bearings Q, freely, being held in place by keys $q'$ traveling in the grooves $q$, in the bearings Q. The plate $y$ is removable from the cylinder, and back of this plate is located adjustable stripping heads S having backwardly extending stems S' that are designed to be supported by and to slide freely in the bearings $t'$, while the head portion S is correspondingly supported in the bearing $t$ in the hub of the cylinder so that the head may readily adjust itself to the various diameters of the cane being operated upon. I prefer that the heads S have, mounted thereon, short knives or cutters, as $s'$, to cut the leaves from the cane, as they approach the heads, and antifriction rollers $s$, so arranged that small or large ends of cane may be entered, it being understood that the cane is always entered top end first, and the rollers will travel over the cane without marring it and will facilitate the longitudinal adjustment of the heads S as the cane passes through and the diameter increases. These heads are actuated to hold them against the cane by springs, as indicated at T in Fig. 4.

It will be readily seen that the cane is fed through the cylinders by being passed between the rollers s, and, having passed through the opening in the hub Q, it is forced between the feed rollers R R, the upper of which is, preferably, supplied with projecting spines 19, that will engage the cane and force it through between the rollers to, and upon the conveyers 10.

To drive the cylinders N, I place a tight and a loose pulley, l and l', upon the main shaft B', and a corresponding tight and loose pulley, l and l', on the shaft K, so that the shaft K may be made to revolve or not, at pleasure, when the shaft B' is revolving. To the opposite end of the shaft K I secure a pulley k, fitted for the reception of the two belts, 4 and 12, the latter of which leads across to, and drives the idler k', which, in turn, supports and drives the belt 4'. The belt 4, and also 4', passes down from the pulley k and the idler k' to and around the pulleys V, on the cylinders N, the belt 4' being crossed to drive the left hand cylinder in the opposite direction from that of the cylinder at the right of the machine, so that both cylinders revolve in, in the direction of the arrows in Fig. 3, so that the knives n, on the cylinders, and n' will form a shearing cut to cut off the tassels from the tops of the cane, when they are placed upon the knife n' for that purpose.

For driving the feed rollers R R, I place a pulley o upon the shaft K and idlers o' adjacent thereto so that the belt O may be passed from the pulley o over said idlers and to and around the pulley p', on the shaft p, to form an angle belt for causing the vertical shaft p to revolve. On the shaft p is mounted a bevel gear wheel 15, so adjusted that it will slide freely longitudinal of the shaft while being made to revolve with the shaft by engagement with the spline, or key 16. This gear wheel is made to mesh with the gear wheel r, on the shaft that carries the upper roller R, thus causing this roller to revolve with the shaft p and is of sufficient weight to avert the danger of being forced to climb out of engagement with the gear r. The lower roller R is simply an idler and is made to revolve by the motion of the cane as it is being carried through by the roller above. As it is necessary to hold the lower roller in contact with the cane that is passing between the rollers and, at the same time, to have it properly adjustable to the various diameters of the cane, I place springs 18 below the boxes, r', that support this roller, and provide for adjusting the tension of these springs by the screws U acting upon the cross girth u u. At the upper end of the shaft p is mounted a pulley 13 for driving a belt, as O', to a second pulley 14, for driving a second shaft, p, on the opposite side of the machine, corresponding in office and action with the shaft p already described, for driving the feed rollers.

For driving the conveyer mechanism I form a transmission and reversing mechanism consisting of the gear wheels a a', driven from the main shaft B' by the belt 5, the wheel a meshing with the gear wheel i which is loosely mounted on the shaft I, and the gear wheel a' meshing, through the idler 8, with the loose gear wheel i', mounted on the shaft I, and the reversing clutch 3, mounted on said shaft between the gear wheels and actuated by the lever 9 to transmit motion from the main shaft B' to the shaft I to cause said shaft to revolve either to the right or to the left, as desired. On the side of the machine opposite the shaft I, I journal a second shaft I', and on both of these shafts I place sprocket wheels j for carrying sprocket chains J' which act, not only as conveyer chains to carry cane across the machine, but to transmit motion from the shaft I to the shaft I', and to complete the conveyer and provide for carrying the cane out of the machine and to position to be dropped into a cart, or other place outside of the machine, I form the wings that carry the shafts J, said shafts being provided with sprocket wheels j, the same as the shafts I I', over which the chains 10 pass and are made to travel, the chains being, preferably, provided with projecting arms 11, as shown in Fig. 3, for carrying the cane up to position to be dropped where desired. These wings are designed to be pivoted upon the shafts I and I' so that they can be adjusted to any desired angle.

The belt L, that drives the shaft K, may be shifted from the tight pulley l to the loose pulley l', or vice versa, by means of the shifter M, having the shifting arms m which pass, one, each side of the belt to move it as desired.

I have broken away a portion of the roller s, in Fig. 6, to show a cutting edge at 20, designed to cut the leaves that may be left on the cane when it has reached this line, and when this is used I prefer that the roller be made straight as the cutting edge, thereby, is more likely to engage and cut the leaves than if it is made conical shaped, as in Figs. 4 and indicated in Fig. 7.

E represents a wheel and shaft for steering the machine, which is done by means of the connecting rod e pivoted at one end to a lever on said shaft and at the other end with the arm D, as at e', said arm D being connected with a corresponding arm at the other side of the machine, said arms being securely attached to the pivot pin c, and the latter securely connected with the hub of the front wheels C so that any motion given to the arms D D will be transmitted to the wheels to carry the machine in the direction the wheels are turned, laterally, in the usual manner of guiding automobiles &c. m' represents a seat for the driver to sit in when operating the machine, and u' u' are lugs on the lower roller box r' for the springs 18 to act upon.

The heads S may be prevented from passing too far into the opening through the cylinders N by means of a shoulder, as 21, or any other convenient and available means.

At 17, in Fig. 8, I have shown the mortise through which the key q' passes to engage the groove q in the bearing Q.

I do not desire to restrict myself to the exact mechanical devices herein shown and described to accomplish the several features set forth in this machine, as many well known mechanical equivalents exist that may be applied for any of the several combinations without the exercise of any inventive genius.

Having thus fully described my invention, what I claim as new and desire to secure by Letters Patent of the United States, is:

1. In a cane harvester, front and hind wheels, axletrees supporting the same, a body mounted upon the axle trees, a motor on said body, a transmission gear connected with the motor and with the hind axletree to cause the axletree to revolve, shifting levers for actuating the transmission gear, a motor shaft, a line shaft run from the motor shaft, a driving pulley on the back end of the line shaft, an idler on the opposite side of the machine from the pulley, annular revoluble cylinders mounted below the pulley and idler, pulleys upon said cylinders, belts connecting said cylinder pulleys with the driving pulleys, spring actuated heads in said cylinders, rollers in the ends of said heads, cutting knives thereon, feed rolls back of said cylinders, knives secured to the face of said cylinders and radiating therefrom, and knives secured to the body of the machine in the line of travel of said first mentioned knives, and a conveyer adjacent to said cylinders and connected with the motor, and a steering gear.

2. In a cane harvesting machine, a truck having wheels and a body, a motor mounted thereon, a transmission gear connected with the motor and with the wheels, a steer-gear, a motor shaft, a tight and loose pulley thereon, a line shaft, a tight and loose pulley thereon, a belt leading from the pulleys on the motor shaft to the pulleys on the line shaft, revoluble cylinders having a central aperture and driven from the line shaft, knives radiating out from said cylinders, corresponding knives on the truck body, spring actuated heads in said cylinders, cutting knives thereon, rollers in the ends of said heads, cutting edges at the end of said rollers, a supporting post on the truck, a bearing integral with said post, a groove in said bearing, a key secured to the cylinders and traveling in said groove, feed rollers in said supporting post, means for revolving said feed rollers, means for adjusting said rollers to the diameter of the cane, a conveyer running crosswise of the machine, and a transmission and reverse gear connecting said conveyer with the motor.

3. In a cane harvester, a supporting truck, a motor mounted thereon and connected to propel the truck, a motor shaft having pulleys thereon, a line shaft having pulleys thereon and driven from the motor shaft, posts supporting the line shaft, cylinders mounted on said posts and having a central opening, spring actuated heads entering and radiating from said opening, rollers and knives carried by said heads, knives radiating from the cylinders, corresponding knives secured to the truck, feed rollers front of the cylinders, a vertical shaft and bevel gear for driving said rollers, an angled belt driven from the line shaft to said vertical shaft, means for holding the feed rollers adjustable to the cane passing between them, a conductor running crosswise of the truck and having a fixed horizontal portion and an adjustable wing at each side, a transmission and reversing gear connecting said conveyer with the motor, and steering gear upon the truck.

4. In a cane harvester, a supporting truck, a motor mounted thereon and connected to propel the truck, a steering gear on said truck, a motor shaft having pulleys thereon, a line shaft having pulleys thereon and driven from the motor shaft, posts supporting said line shaft, cylinders supported on said posts to revolve and having a round opening through the center, spring actuated heads entering said opening and radiating therefrom, rollers and knives carried by said heads, feed rollers in the post supporting said cylinders, the top feed roller driven by a vertical shaft and a pair of bevel gear wheels, an angled belt driven from the line shaft to said vertical shaft, springs holding the lower feed roll to adjustable position with the upper roller, screws for adjusting said springs, a conveyer running crosswise of the truck and having an adjustable wing at each side of the truck, and transmission and reversing gear connecting said conveyer with the motor, and knives for trimming the tassels from the cane.

Signed at Grand Rapids, Michigan, November 1, 1905.

JOHN D. COOPER.

In presence of—
GEORGIA E. CILLEY,
ITHIEL J. CILLEY.